US007020883B2

(12) United States Patent
Takai et al.

(10) Patent No.: US 7,020,883 B2
(45) Date of Patent: Mar. 28, 2006

(54) LOADING MECHANISM OF DISK PLAYER

(75) Inventors: Kazuki Takai, Tokyo (JP); Akira Takahashi, Nagoya (JP); Yoshikazu Omura, Nagoya (JP)

(73) Assignee: Clarion Co., Ltd., Tokyo (JP)

( * ) Notice: Subject to any disclaimer, the term of this patent is extended or adjusted under 35 U.S.C. 154(b) by 337 days.

(21) Appl. No.: 10/381,689

(22) PCT Filed: Sep. 26, 2001

(86) PCT No.: PCT/JP01/08332

§ 371 (c)(1),
(2), (4) Date: Mar. 25, 2003

(87) PCT Pub. No.: WO02/27718

PCT Pub. Date: Apr. 4, 2002

(65) Prior Publication Data

US 2003/0174628 A1 Sep. 18, 2003

(30) Foreign Application Priority Data

Sep. 26, 2000 (JP) ............................ 2000-293019
Mar. 13, 2001 (JP) ............................ 2001-070685

(51) Int. Cl.
*G11B 17/04* (2006.01)

(52) U.S. Cl. ...................................................... 720/607

(58) Field of Classification Search ................ 720/607, 720/659, 667, 695; 369/75.21, 77.11
See application file for complete search history.

(56) References Cited

U.S. PATENT DOCUMENTS

| | | | | |
|---|---|---|---|---|
| 5,187,701 | A * | 2/1993 | Verheyen | 720/601 |
| 5,195,079 | A * | 3/1993 | Inoue et al. | 720/635 |
| 5,202,861 | A * | 4/1993 | Yoshida | 369/13.2 |
| 5,608,705 | A * | 3/1997 | Tanaka | 720/605 |
| 5,822,290 | A * | 10/1998 | Lee | 720/607 |
| 6,411,584 | B1 * | 6/2002 | Davis et al. | 720/713 |
| 6,667,942 | B1 * | 12/2003 | Maeda | 720/642 |
| 6,795,970 | B1 * | 9/2004 | Wada et al. | 720/659 |
| 2003/0202448 | A1 * | 10/2003 | Arai et al. | 369/75.2 |

FOREIGN PATENT DOCUMENTS

| | | |
|---|---|---|
| JP | 58-45659 | 3/1983 |
| JP | 360061948 A * | 4/1985 |
| JP | 1-235062 | 9/1989 |
| JP | 5-27848 | 4/1993 |
| JP | 5-151697 | 6/1993 |
| JP | 408031072 A * | 2/1996 |
| JP | 10-199095 | 7/1998 |
| JP | 2000-298904 | 10/2000 |

* cited by examiner

*Primary Examiner*—Allen Cao
(74) *Attorney, Agent, or Firm*—Flynn, Thiel, Boutell & Tanis, P.C.

(57) ABSTRACT

A disk loading mechanism has a turntable. A turntable 36 itself is fixed in external dimensions of a brushless spindle motor, and a chucking face relevant to a disk 11 is precisely placed on a turntable base 46 with a predetermined height. On the turntable base 46, columns 47 are embedded in three directions on a circumference which surrounds the outer periphery of the turntable 36. A column tip end stepped portion **47*b* and a disk placement face 36*a* of the turntable 36 are precisely constructed in predetermined dimensions. When the column tip end stepped portion 47*b* abuts against a bottom face (a reference face L) of a drive board 15, a relative position between the disk placement face 36*a* of the turntable 36 and a pickup constructed while the bottom face of the drive board 15** is defined as a reference is precisely determined.

5 Claims, 8 Drawing Sheets

(a)

(b)

LOADING MECHANISM OF DISK PLAYER

TECHNICAL FIELD OF THE INVENTION

The present invention relates to a disk player for reproducing an optical disk signal including CD, LD, DVD, etc. More particularly, the present invention relates to a mechanism for automatically carrying an inserted disk to a turntable to align its center, and then, chucking the disk in a reproducible state.

BACKGROUND OF THE INVENTION

When one disk to be reproduced is manually inserted into an insert port, automatic operation is carried out from carrying to a turntable to clamping. After the end of reproduction, in a disk player for ejecting the disk by automatic operation, a clamper must be positioned upwardly via a gap from a disk top face so as not to interface with a disk face basically in a process for injecting or ejecting the disk. In addition, the turntable must be positioned lower than a disk bottom face so that a center projection engaging with the disk does not inhibit invasion of the disk bottom face.

In addition, a guide for guiding insertion or ejection of the disk and a roller for supplying power for carrying the disk must come into contact with the disk face during disk movement, and a gap must be provided between the guide or roller and the disk during reproduction. Further, in order to interrupt external vibration, some gap must be ensured in the vertical direction of the disk face in consideration of the fact that an apparatus is set in a floating state.

Therefore, means for providing a gap at the top and the bottom of the disk is proposed. For example, an embodiment of inserting a disk D into a fixed turntable 21 is disclosed in Japanese Patent Application Laid-open No. 58-45659.

In addition, in Japanese Patent Application Laid-open No. 10-199095, there is disclosed an embodiment of fixing the height for inserting a disk 12, and then, vertically turning a turntable 71 and a disk clamp arm 73 around a hinge 74 during insertion to open them in a hinged manner. Otherwise, there are disclosed embodiments of fixing a position of a loading carriage roller or a fixing an upper face guide plate.

Basically, the disk is pinched between a roller which rotates to carry the disk at the time when the disk is inserted and a flat guide face. Then, the pinched disk is chucked by a turntable at a position at which the center of the disk is aligned with the rotary shaft of the turntable. In a state in which the disk can rotate together with the turntable, the roller and the guide face are relatively spaced from each other so that a gap is provided between the roller or guide and the disk face, whereby stable rotating movement for the disk must be obtained. Thus, it is mandatory to ensure a gap in the thickness direction relevant to the disk.

However, for a disk player which is used for a car or which functions while it is incorporated in a computer, a market requires compact design with space reduction and light weight, high reliability due to simplified structure, and low price. Planar dimensions parallel to the disk face cannot be reduced to be equal to or smaller than the external diameters of the disk. In addition, in order to maintain the strength of parts and ensure the durability of products, dimensional reduction of composite elements is limited. The dimensions in the thickness direction vertical to the disk face is reduced by a construction of the loading mechanism, thereby meeting the requirements.

It is an object of the present invention to provide a disk loading mechanism which is reliably actuated, the disk loading mechanism being applied to a disk player with its low cost having minimized the dimensions in the thickness direction with a simplified construction.

DISCLOSURE OF THE INVENTION

In order to achieve the above described object, a disk player loading mechanism according to the present invention is characterized in that a reference face for setting the disk setting face of a turntable is defined as one face of a drive board on which a pickup is installed; and the turntable is moved from a standby position, and is chucked at a disk reproduction position at which the disk is set from the reference face parallel to a predetermined interval in cooperation with another disk clamp separately provided. The turntable is formed integrally with a brushless spindle motor, and can move independent of the pickup.

In addition, the disk is automatically carried from the insert port onto the turntable by means of a carriage mechanism driven by the motor. The turntable is mechanically moved at the same time when the disk is carried. The carriage mechanism comprises disk pinching means which cooperates with at least one roller. These elements move to a position spaced from the disk or a position at which the disk is pinched together with a chucking operation or a standby movement of the turntable and disk clamp. Moreover, all of the disk chucking or releasing operation by the turntable and disk clamp and the disk pinching or spacing operations by the disk pinching means are interlocked with sliding of a cam formed on a single slide plate.

BEST MODE FOR CARRYING OUT THE INTENTION

Figure 1:
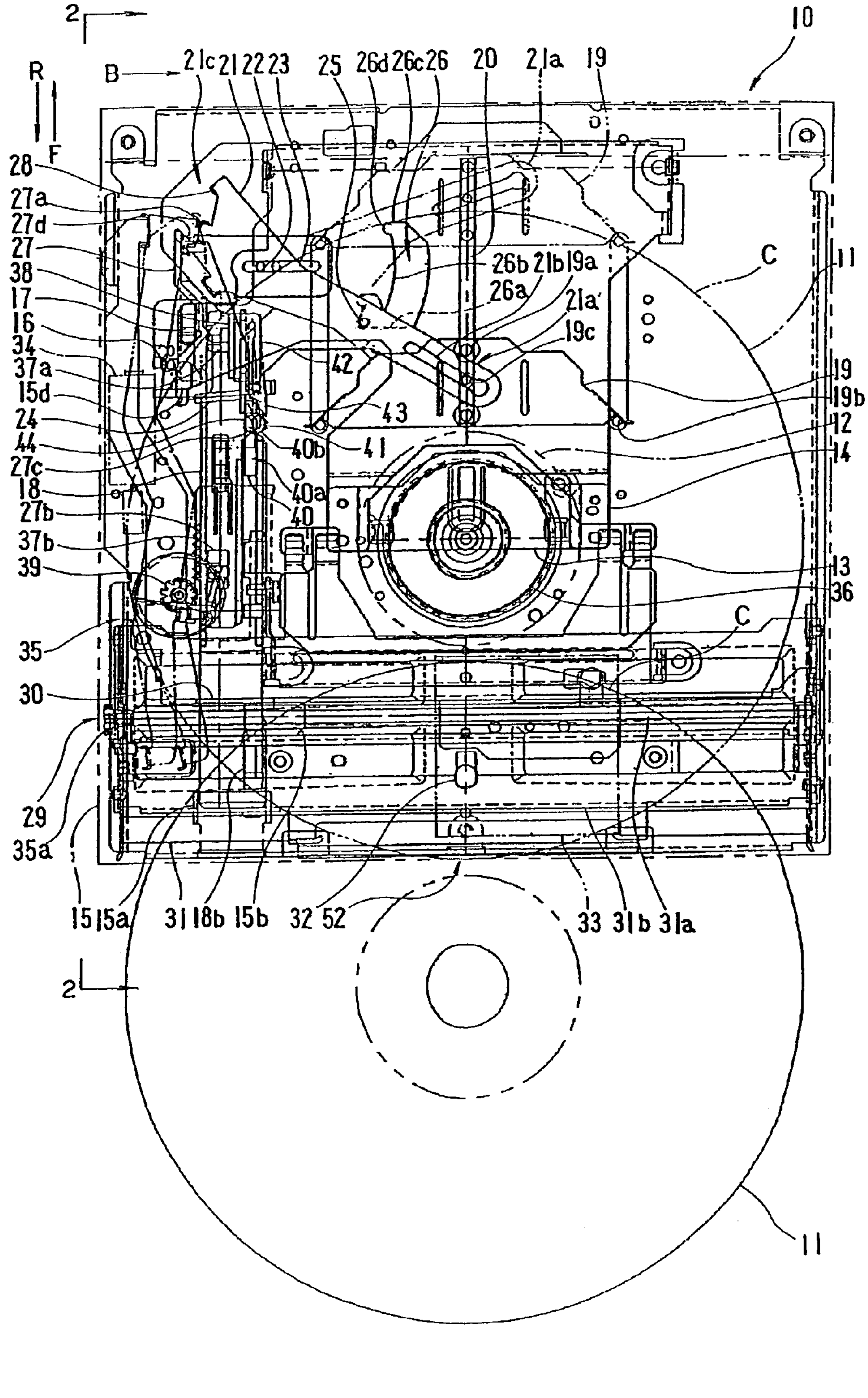
FIG. 1 is a schematic plan view showing an entirety of a disk player including a disk player loading mechanism according to the present invention.
Figure 2:
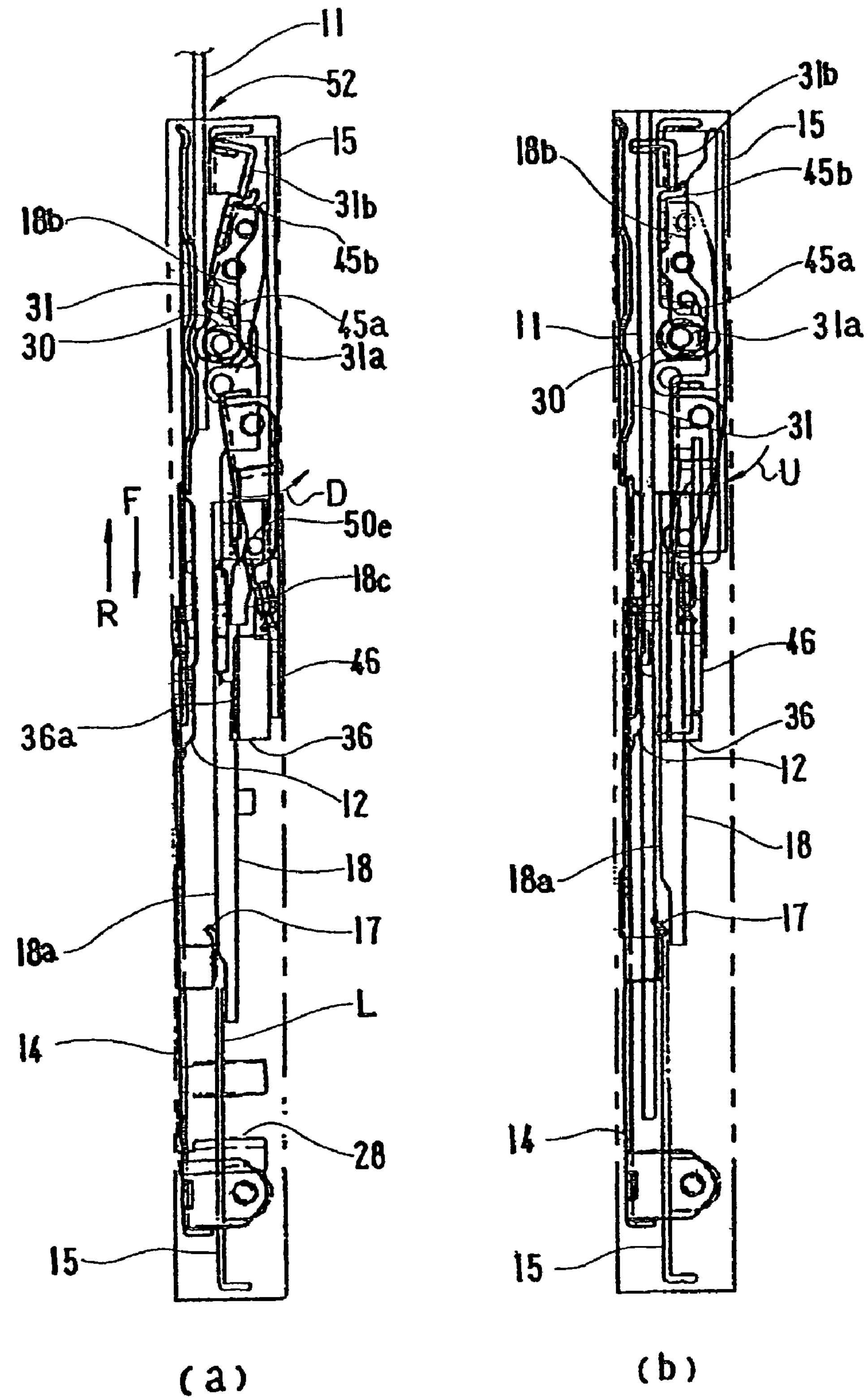
FIG. 2 is a schematic side view taken along the line 2—2 of FIG. 1, wherein (a) shows a state in which the disk is carried, and (b) shows a state in which the disk is chucked.
Figure 3:
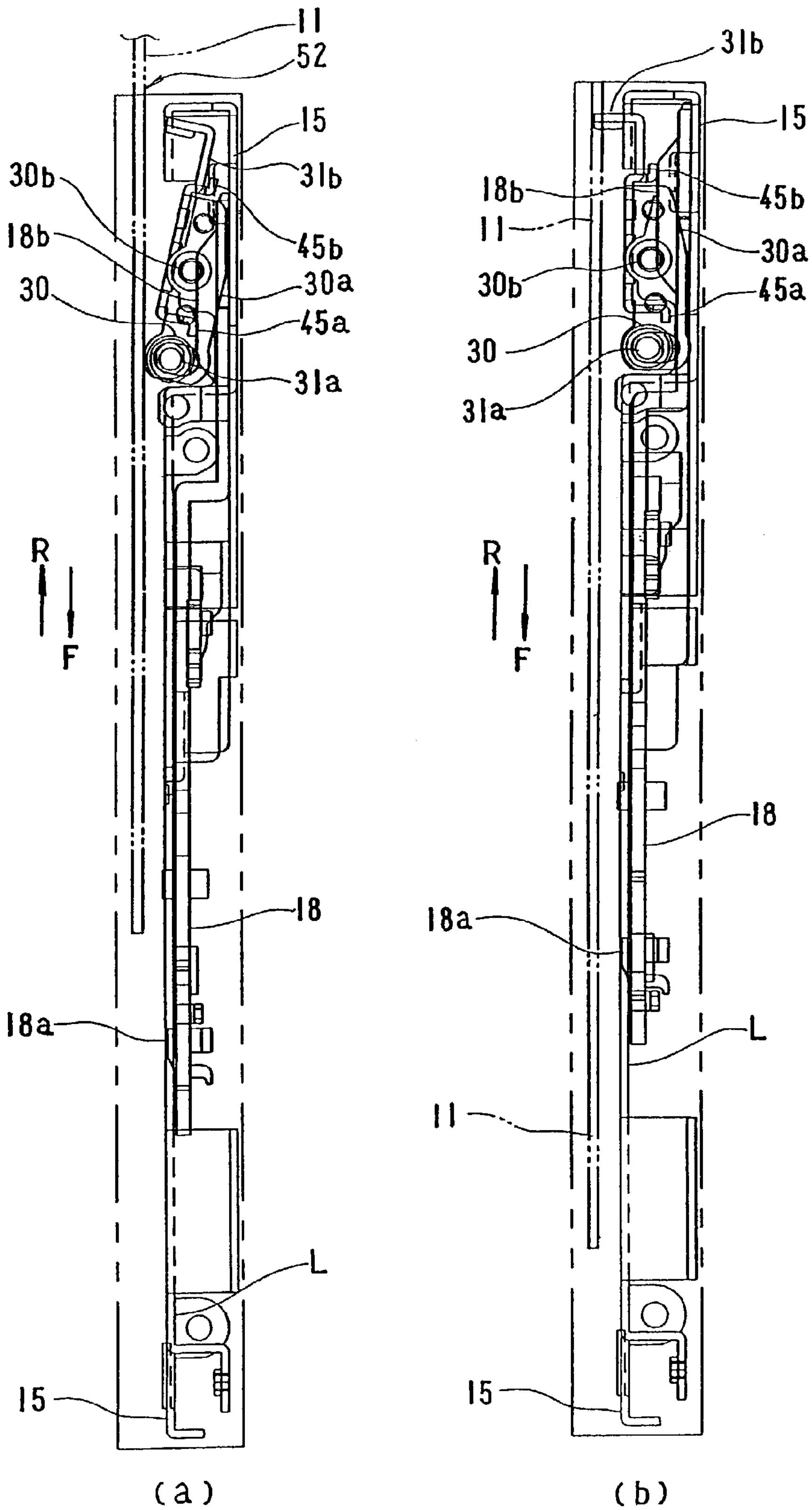
FIG. 3 shows a carriage mechanism portion in the disk player loading mechanism according to the present invention, wherein (a) shows an aspect in which the disk is carried after being pinched, and (b) is a side view showing an aspect spaced from the disk.
Figure 4:
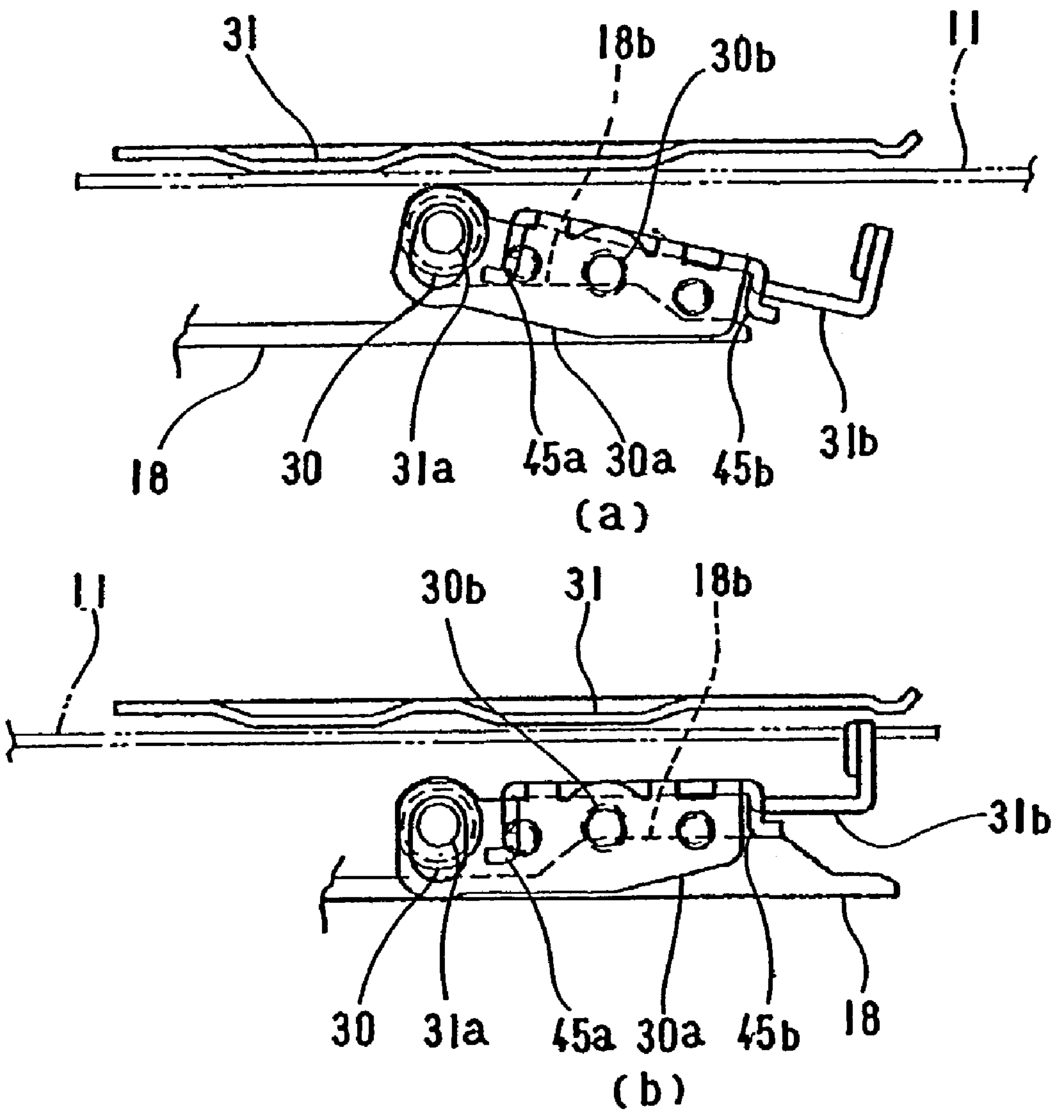
FIG. 4 is a view illustrating an operation of a disk carriage roller in a disk player loading mechanism according to the present invention, wherein (a) shows a mode in which the disk is pinched, and (b) is a side view showing an aspect spaced from the disk in a partially enlarged manner.
Figure 5:
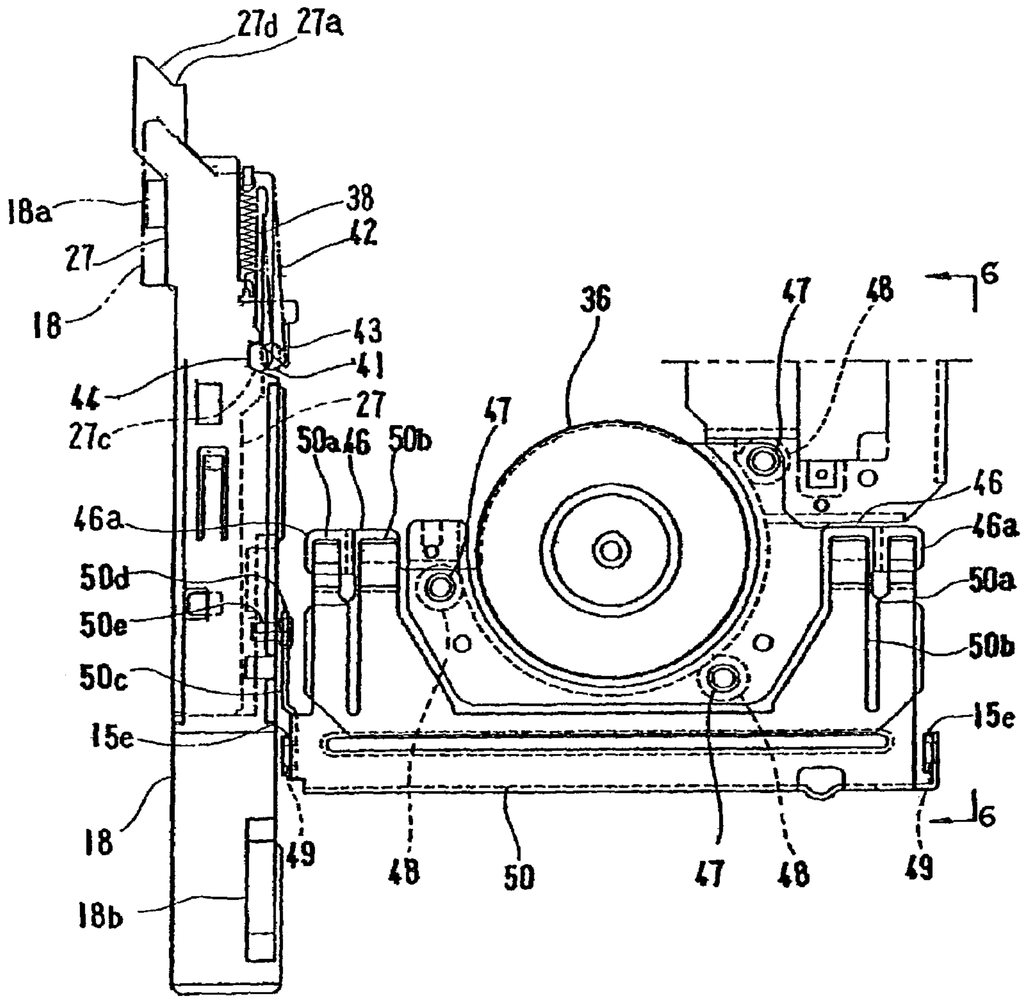
FIG. 5 is a enlarged plan view illustrating a portion at which the turntable is actuated in the disk player loading mechanism according to the present invention.

Hereinafter, preferred embodiments of the present invention will be described with reference to the accompanying drawings showing one embodiment of a disk player loading mechanism according to the present invention. FIG. 1 is a schematic plan view showing the entirety of the disk player including the loading mechanism according to the present invention. FIG. 2 is a schematic side view taken along the line 2—2 of FIG. 1. FIG. 3 and FIG. 4 are illustrative views of a carriage mechanism. FIG. 5 is a plan view illustrating essential portions of a turntable in an enlarged manner. For clarity, sectional views or partial omissions are made in the above drawings. In addition, a moving position of structural components are indicated by double dotted chain line as required.

In FIG. 1, a disk player 10 in a standby state is indicated by the solid line, and a disk 11 indicated at its insert position by the solid line is carried and chucked at its position indicated by double dotted chain line by actuation of a carriage mechanism. When the disk 11 is chucked at its predetermined position, a clamp ring 12 rotatably engaged with a clamp arm 14 with play via a clamp plate spring 13 brings the disk 11 into pressure contact with a turntable face 36*a* with spring elasticity of the plate spring 13. The side view of this aspect is shown in FIG. 2.

A tensile coil spring 16 is provided in a tensile manner between the clamp arm 14 and the drive board 15, and the clamp arm 14 is biased downwardly (in the direction of the drive board 15). A part of the clamp arm 14 is bent downwardly in the vicinity of the tensile coil spring 16 to form a cam follower 17; the biasing force of the tensile coil spring 16 is supported by a first cam face 18*a* protruded on a slide plate 18; and the clamp ring 12 is held at its upper standby position at the opening position of the clamp arm 14 (refer to FIG. 2(*a*)).

A shift bar 19 can slide a long groove 20 provided at the clamp arm 14 to a guide in the vertical direction in the figure (in the direction indicated by the arrow F-R), and moves in parallel due to inward engagement of two guide pins 19*a* embedded at a position spaced along the long groove 20. In addition, an erected piece 19*b* folded downwardly at a right angle is formed at both ends of the shift bar 19, and abuts against an outer periphery edge C of the advancing disk 11.

A startup arm 21 can be turned around the embedded swivel shaft 22. The swivel shaft 22 is slidably engaged into a straight groove 23 of the clamp arm 14. The straight groove 23 is punched in the vertical direction (in the direction indicated by the arrow B) relevant to the advancement direction of the disk 11, and the startup arm 21 can slide in the transverse direction along the straight groove 23. A coupling pin 19 erected at the center of two guide pins 19*a* of the shift bar 19 is slidably engaged into a long hole 21*b* punched at a first protrusion end 21*a* of one of the startup arms 21.

In addition, a tensile coil spring 24 is provided in a tensile manner between the startup arm 21 and the clamp arm 14, and the startup arm 21 is biased in the clockwise direction in the figure. Further, at the startup arm 21, a cam follower pin 25 is embedded at the substantially intermediate part between the end of the long hole 21*b* and the swivel shaft 22; abuts against a front edge 26*a* of an inscribed cam 26 punched at the clamp arm 14; supports the biasing force of the tensile coil spring 24; and restricts turning movement of the startup arm 21. Further, a slide rack 27 interlocking the above mentioned slide plate 18 is moved to be pushed at a second protrusion end 21*c* positioned at the opposite side of the first protrusion end 21*a* while the swivel shaft 22 of the startup arm 21 is pinched, whereby a link portion 28 for starting up a chucking operation of the disk 11 is formed.

On the other hand, a roller 30 incorporated into the carriage mechanism 29 pinches or spaces the disk 11 from both faces, interlocking with a top face guide plate 31 which guides the disk 11 in substantially parallel to the turntable face. That is, the disk 11 is pinched between the roller 30 and the top face guide plate 31 in a proximal position, and is carried in the vertical direction in the figure (in the direction indicated by the arrow F-R). In addition, a printed circuit wiring board 33 including a photo sensor 32 for sensing insertion and ejection of the disk 11 is arranged at the top face of the top face guide plate 31. When the sensor senses insertion of the disk 11, a drive motor 34 starts up. Then, the motor interlocks a gear 35*a* directly connected to a rotary shaft 31*a* of the roller 30 via a gear train 35, and rotates the roller 30 in the direction in which the disk 11 is fed to the turntable 36.

Figure 7:
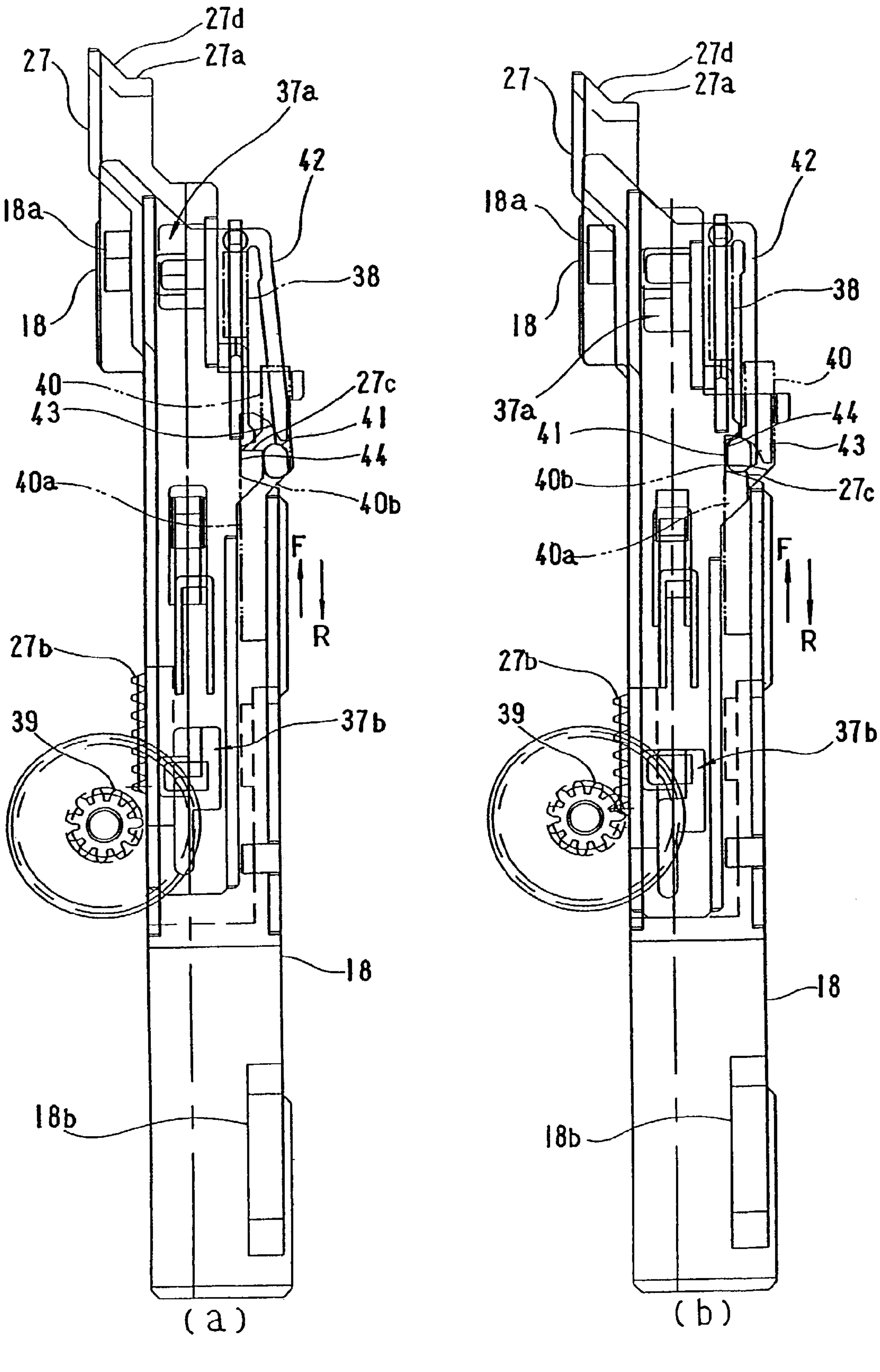
FIG. 7 is an enlarged plan view illustrating a relationship between a slide rack and a slide plate in the disk player loading mechanism according to the present invention, wherein (a) shows a state in which relative movement is possible, and (b) shows a state in which the integrated movement is made.
Figure 8:
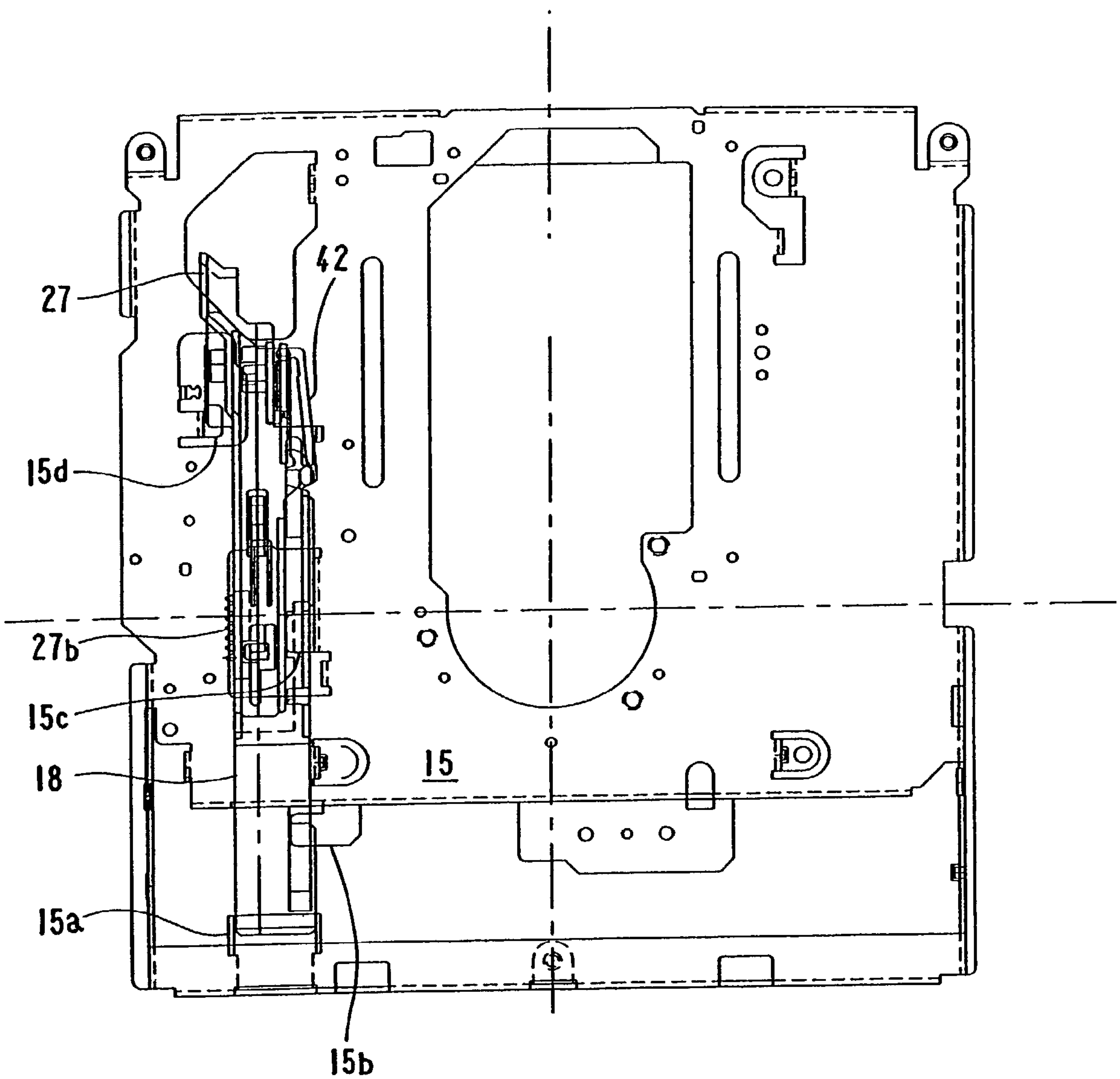
FIG. 8 is a schematic plan view illustrating a relationship between a slide rack and a drive board of the slide plate in the disk player loading mechanism according to the present invention.

The slide rack 27 guided to engagement portions 37*a*, 37*b* and coupled with the slide plate 18 so that relative movement is possible in a predetermined distance is biased in the direction spaced from a drive pinion 39 by a tensile coil spring 38 provided in a tensile manner between the rack and the slide plate 18 (refer to FIG. 7). The slide plate 18 can slide along the lower face of the drive board 15 in the forward or the backward direction parallel to the direction in which the disk moves to cut pieces 15*a*, 15*b*, 15*c*, and 15*d* of the drive board 15 (refer to FIG. 8). Thus, in the present embodiment, a rotation face of the drive pinion 39, i.e., a side face defining the thickness of the slide rack 27 is arranged so as to be parallel to the drive board 15, thereby reducing the dimensions in the thickness direction.

A link portion 28 provided at the end of the startup arm 21 is opposed to an end 27*a* at the depth side (in the direction indicated by the arrow F) of the slide rack 27. The link portion 28 abuts against the end 27*a* of the slide rack 27 by a swiveling operation of the startup arm 21 which turns together with the shift bar 19 moved to be pushed against the disk 11. Then, the slide rack 27 is relatively moved to the frontal side (direction indicated by the arrow R) on the slide plate 18, and the tooth portion 27*b* is moved to be pushed against a position geared with the drive pinion 39. That is, as shown in FIG. 7(*a*), the slide plate 18 abuts against a bent site 40*b* of a crank shaped cam groove 40 (indicated by the double dotted chain line) on which a cam follower 41 protruded laterally via a plate spring 42 is punched on the drive board 15. Thus, the slide rack 27 moved to be pushed against the link portion 28 moves relatively to the slide plate 18 against the biasing force while extending the tensile coil spring 38 provided in a tensile manner between the rack and the slide plate 18 (refer to FIG. 7(*b*)).

The slide rack 27 engages the cam follower 41 into a recess 44 of the slide plate 18 at an integrally formed action piece 43 while a tooth portion 27*b* is close to the drive pinion 39. At the same time, the bent site 40*b* is released, and is advanced into an inductive groove 40*a* of the crank shaped cam groove 40. While the tooth portion 27*b* of the slide rack 27 is driven by engagement with the drive pinion 39, the cam follower 41 holds engagement with the recess 44 by means of the constrain of the inductive groove 40*a*. In this manner, in the slide rack 27, an integrally provided stopper 27*c* is engagingly locked with the cam follower 41, and a position relative to the slide plate 18 is fixed and integrally moved while the tensile coil spring 38 is held in an extended state (refer to FIG. 7(*b*)). The slide plate 18 actuates a limit switch (not shown) at a maximum stroke position, and stops rotation of the drive pinion 39.

When the drive pinion 39 is inverted, the tooth portion 27*b* of the slide rack 27 synchronizes with a position at which gearing with the drive pinion 39 is released. Then, the cam follower 41 reaches the bent site 40*b* of the crank shaped cam groove 40, and the constraint is released. Here, the stopper 27*c* of the slide rack pushes the cam follower 41 from a recess 44 in cooperation with the plate spring 42, and releases the engagingly locked state.

The slide rack 27 is forcibly moved in the direction spaced from the drive pinion 39, e.g., in the upward direction in the figure (in the direction indicated by the arrow F) by the contraction force of the tensile coil spring 38. Then, the slide rack returns to its initial state completely spaced from the drive pinion 39. A plurality of cams are formed on the slide plate 18. The cam followers engaged with the respective cams are interlocked with each other by reciprocating actuation of the slide plate 18, and movements of the clamp arm 14, the top face guide plate 31, the roller 30, and the turntable 36 are controlled.

As described previously, the clamp arm 14 rises or lowers according to the advancement or retraction (in the direction indicated by the arrow F-R) of the slide plate 18 while the downwardly extending cam follower 17 keeps in slide contact with the first cam face 18*a* protruded on the slide plate 18. The roller 30 is rotatably supported by the roller arm 30*a* on which the rotary shaft 31*a* is formed by downwardly folding both ends of a transverse column 31*b*. In addition, the roller arm 30*a* is rotatable around the support shaft 30*b*, and either of the cam followers 45*a* and 45*b* extended by folding ribs at the front and the rear edges of the transverse column 31*b* is pushed up by the advancement and retraction (in the direction indicated by the arrow F-R) of the second cam face 18*b* protruded on the slide plate 18. The roller 30 rises up to a predetermined position by pushup of the cam follower 45*a*, pinches the disk 11 by the spring action (not shown), and is spaced from the disk 11 by pushup of the cam follower 45*b* (refer to FIG. 2 to FIG. 4).

Figure 6:
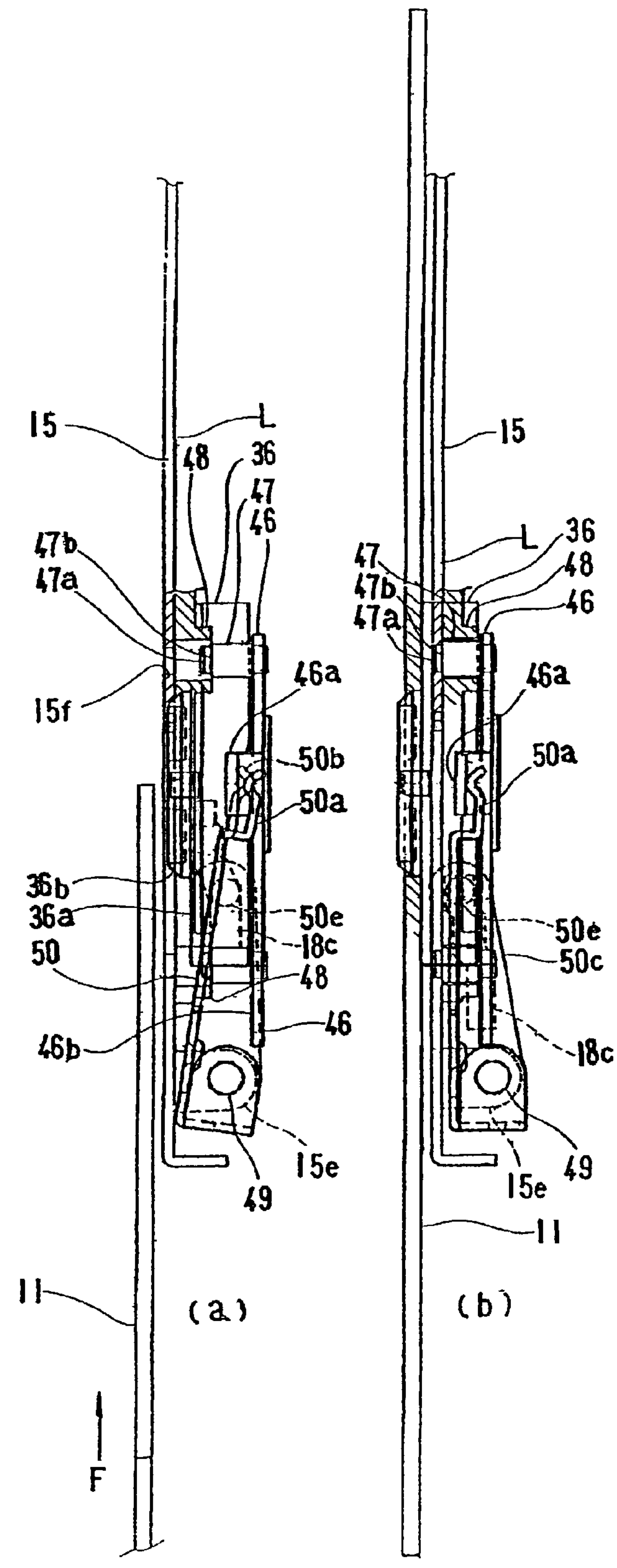
FIG. 6 is a schematic side view taken in the line 6—6 of FIG. 5 in an enlarged manner, wherein (a) shows a state in which the disk in inserted, and (b) shows a state in which the disk is chucked.

A loading mechanism of a disk player 10 according to the present invention will be described in detail with reference to FIG. 5 and FIG. 6. A turntable 36 itself is defined externally of a brushless spindle motor, and a top face on which the disk 11 is chucked is precisely placed on a turntable base 46 with a predetermined height. On the turntable base 46, columns 47 are embedded respectively in three directions on a circumference which surrounds the outer periphery of the turntable 36.

Planes defined by convergent stepped portions 47*b* of the three columns 47 are parallel to a disk placement face 36*a* of the turntable 36, and the interval in the height direction is precisely finished in predetermined dimensions. Therefore, when the convergent stepped portion 17*b* at the tip end of the column abuts against the lower face (reference face L) of the drive board 15, a relative position between the disk placement face 36*a* of the turntable 36 and a pickup (not shown) is precisely determined in predetermined dimensions.

Namely, a pickup running face is configured by specifying the bottom face of the drive board 15 on the reference face L. Only the turntable 36 is elevated singly while the disk placement face 36*a* set by this reference face L is defined as the upper limit. That is, an operating portion does not cover the entire pickup mechanism. Thus, there is no need to ensure a wide space as a movement gap, and a compact construction can be achieved because such a movement space is not provided. In addition, unstable elements are eliminated because the entire pickup mechanism is not moved, and the strength or precision can be improved. Further, movement power is unnecessary, and thus, a power mechanism installation space can be reduced.

Both ends of the turntable base 46 configure a support face in cooperation with a horizontal extension portion 46*a* protruded at both sides via a vertical step formed in a crank shape by folding them twice. The outer periphery of the three columns 47 embedded on the turntable base 46 is guided in the vertical direction relevant to a disk face by the internal diameter of a column guide 48. Then, the converged tip end 47*a* is inserted into a through hole 15*f* punched at the opposite position of the drive board, and the convergent stepped portion 47*b* is abutted against the reference face L at the bottom face of the drive board 15, whereby the position in the height direction relevant to the bottom face of the disk 11 can be determined.

A slight turn is permitted so that horizontal extension portion 46*a* formed by bending both ends of the turntable base 46 is supported at free ends of an elevation arm 50 turnably supported on a support shaft 49 of a cut bracket 15*e* of the drive board 15, and then, the turntable base 46 is positioned in parallel to the reference face L. That is, two arms 50*a* and 50*b* are formed at both ends of the elevation arm 50; the horizontal extension portion 46*a* at both ends of the turntable base 46 supports the turntable base 46 from below by the elastic arm 50*a* to which elasticity is applied; and an actuation arm 50*b* free of elastic deformation abuts against a motor mount face 46*b* inside of the vertical step from above, and supports the mount face.

A cam follower 50*e* protruded in the horizontal direction from the free end 50*d* of the actuation arm 50*c* protruded outside of the elevation arm 50 engages with the crank shaped cam groove 18*c* formed to communicate with the grooves at the two top end bottom steps of the slide plate 18. Therefore, as shown in FIG. 2(*a*) and FIG. 2(*b*), the elevation arm 50 turns vertically (in the direction indicated by the arrow U-D) together with the forward or the backward direction (the direction indicated by the arrow F-R) of the slide plate 18. The crank shaped cam groove 18*c* is defined by smaller steps. When the cam follower 50*e* moves to the highest step, the elasticity of the elastic arm 50*a* brings the turntable base 46 into pressure contact with the reference face L via the three columns 47. The elastic support force of the elastic arm 50*a* acted here is sufficiently greater than the compression force caused by the clamp ring 12 on the face of the disk face 11, and the turntable base 46 is not displaced by a chucking operation.

As a result, on the turntable base 46, three embedded columns 47 are vertically guided relevant to the reference face L by the column guide 48, and the tip end face is brought into pressure contact with the reference face L by the biasing force of the elastic arm 50*a*. The face of the turntable 36 moves in parallel to the bottom face of the disk 11, and is aligned with a precise relational position with a pickup (not shown). The three columns 47 position the disk 11 on a stable plane determined by supporting three points. At this time, the actuation arm 50*b* is slightly spaced from the motor mount face 46*b*, and is lifted to a height free from interference with the pressure contact action caused by the elastic arm 50*a*.

Now, an operation of a loading mechanism of the disk player 10 will be described here. When the disk 11 is inserted through a disk insert port 52 of the disk player 10 which is in a standby state, a drive motor 34 sensed by a disk detection photo sensor 32 is started up, and a roller 30 starts its rotation. The disk 11 is horizontally guided while its bottom face comes into slide contact with a bottom face of the top face guide plate 31 by the drive force caused by friction in abutment against the outer periphery face of the roller 30, and is fed to the turntable 36.

In the disk 11 fed by the roller 30, when the outer periphery front edge C abuts against an erected piece 19*b* folded at both ends of a shift bar 19, the shift bar 19 is moved to be pushed in the upward direction in the figure (in the direction indicated by the arrow F) along a long groove 20 by the drive force transmitted from the roller 30. By this operation, a connection pin 19*c* erected by the shift bar 19 and engaged into a long hole 21*b* of a startup arm 21 turns the startup arm 21 around the swivel shaft 22 while sliding the internal wall of the long hole 21*b*. The startup arm 21 is swiveled while being subjected to restriction of an arc shaped cam portion 26*b* for guiding the embedded cam follower pin 25. Then, the link portion 28 is abutted against a rear side end 27*a* of the slide rack 27, and the slide rack 27 is relatively moved to the frontal side (in the direction indicated by the arrow R) on the slide plate 18, and then, is moved to be pushed to the position geared with the drive pinion 39. Although the drive pinion 39 is started up at the same time when the roller 30 is rotated, the timing of gear with the slide rack 27 is controlled by a position at which the shift bar 19 is moved.

When the cam follower pin 25 reaches the engagingly locked position 26*c*, turning movement of the startup arm 21 is inhibited. Then, movement of the disk 11 biasing turning movement via the shift bar 19 is inhibited. At this position, the biasing force of the tensile coil spring 24 is acted with the startup arm 21, the cam follower pin 25 is locked at the lead-in position of a pocket 26*d*, and the position of the disk 11 is determined by the shift bar 19. By chucking operation of the clamp arm 14, the disk 11 subjected to slanting action of a tapered boss 36*b* at the center of the turntable 36 is moved to its aligned position, whereby the outer periphery front edge C of the disk 11 is spaced from the erected piece 19*b*, and is released from its aligned state in the foregoing pushing and moving operation. Then, stable rotation is obtained at the disk 11.

At the slide rack 27, the drive force is transmitted by means of gear with the drive pinion 39 caused by the downward movement in the figure (in the direction indicated by the arrow R), and the slide plate 18 is actuated in the same direction. The first cam face 18*a* on which the cam follower 17 of the clamp arm 14 is placed is removed by movement of the slide plate 18. The clamp arm 14 is lowered due to the biasing force of the tensile coil spring 16, and the disk 11 is chucked on the turntable 36 by the clamp ring 12. On the other hand, the transverse column cam followers 45*a* and 45*b* coming into slide contact with the second cam face 18*b* are interlocked with each other; and the top face guide plate 31 and the roller 30 are moved in the direction spaced from the disk 11, thereby releasing the disk 11 that has been pinched therebetween. Further, the cam follower 50*e* protruded in the horizontal direction from the elevation arm 50 for supporting the turntable base 46 is lifted at the upper stage of the crank shaped cam groove 18*c*, and the top face of the turntable 36 is brought into contact with the lower face of the disk 11.

Now, an operation for ejecting the disk having terminated reproduction will be described here. At the end of reproduction, a drive pinion 39 is inverted by switching operation of an electric circuit (not shown), and the slide rack 27 is moved in the upward direction in the figure (in the direction indicated by the arrow F). The cams 18*a*, 18*b*, and 18*c* provided at the slide plate 18 move together with the slide rack 27 in the reverse direction. Thus, the disk 11 is pinched by the top face guide plate 31 abutting from both of the top and bottom faces and the inverted roller 30, and the clamp arm 14 releases chucking of the disk 11. In addition, the cam follower 50*e* moves to the lower stage of the crank shaped cam groove 18*c* by reverse movement of the slide plate 18. Thus, the elevation arm 50 is lowered, and the turntable 36 is retracted from the bottom face of the disk 11 to the spaced position, and enters its initial standby state. The disk 11 released from chucking is ejected by the roller 30 rotating in the reverse direction.

By the upward movement in the figure (in the direction indicated by the arrow F) of the slide rack 27, a tapered portion 27*d* at the rear end of the slide rack comes into contact with the link portion 28 of the startup arm 21. Further, when the slide rack 27 moves upwardly in the figure, the startup arm 21 is moved to be pushed to the central direction (in the direction indicated by the arrow B) by slanting action of the tapered portion 27*d*. The cam follower pin 25 which constrains the startup arm 21 at the engagingly locked position 26*c* is pushed out from the pocket 26*d*. The startup arm 21 is turned in the clockwise direction by the biasing force of the tensile coil spring 24 provided in a tensile manner between the startup arm and the clamp arm 14, and returns to its initial standby state.

At this time, the tooth portion 27*b* of the slide rack is set at a position at which gearing with the drive pinion 39 is released. The cam follower 41 is released from engagement with the inductive groove 40*a* of the crank shaped cam groove 40, and the stopper 25*c* of the slide rack pushes the cam follower 41 out from the recess 44 and releases engagement. Then, integration between the slide plate 18 and the slide rack 27 is eliminated, and the biasing force of the tensile coil spring 38 is effectively acted. Then, the tooth portion 27*b* of the slide rack 27 is returned to its initial position spaced from the drive pinion 39, and enters its standby state. The completion of ejecting the disk 11 can be checked by the photo sensor 32.

Although one embodiment of the disk player loading mechanism according to the present invention has been described above, the present invention is not limited to the illustrative embodiment. Various modifications concerning detailed portions or reconstruction of parts can occur without departing from essential constituent elements of the present invention. For example, although a turntable itself has been defined in external dimensions of a brushless spindle motor, a turntable formed independent of the spindle motor may be pressed into the rotary shaft of the spindle motor.

INDUSTRIAL APPLICABILITY

As is evident from the foregoing description, in a disk player loading mechanism according to the present invention, a pickup running face is specified with a bottom face of a drive board being a reference face. While a turntable face set by this reference face is defined as an upper limit, a turntable is elevated independent of a pickup. Thus, a relative position relationship between a disk recording face and the pickup can be very precisely maintained by applying a simple and smooth movement mechanism. In addition, the turntable and motor are integrally constructed, and the movement mechanism fully functions by a single slide plate only. Thus, the entire mechanism can be thinly constructed.

Further, in a construction for moving only the turntable to the disk, unlike a construction for moving the entire reproduction mechanism based on a consideration that precise relative positioning between the pickup and the disk face is not hindered, a pickup movement space can be effectively used. Moreover, a load or burden on moving the entire reproduction mechanism to the drive motor is eliminated, and power thereof can be reduced.

The invention claimed is:

1. A disk player loading mechanism comprising:

a turntable adapted to move from a standby position to chuck a disk at a disk reproduction position in cooperation with a disk clamp, the disk reproduction position at which the disk is chucked sets a disk placement face of the turntable in parallel to and a predetermined interval from a reference face, the reference face for setting the disk placement face of the turntable is defined as one face of a drive board on which a pickup is installed;

wherein the turntable is formed integrally with a brushless spindle motor, and is moveable independent of the pickup.

2. A disk player loading mechanism comprising:

a turntable adapted to move from a standby position to chuck a disk at a disk reproduction position in cooperation with a disk clamp, the disk reproduction position at which the disk is chucked sets a disk placement face of the turntable in parallel to and a predetermined interval from a reference face, the reference face for setting the disk placement face of the turntable is defined as one face of a drive board on which a pickup is installed;

a carriage mechanism driven by a motor automatically carrying the disk from an insert port to the turntable, the turntable being mechanically moved together with carriage of the disk;

wherein the carriage mechanism comprises disk pinching means in cooperation with at least one roller, and these elements move to a position spaced from the disk or a position at which the disk is pinched, together with chucking operation or standby operation of the turntable and the disk clamp; and wherein all of the disk chucking or releasing operation by the turntable and disk clamp and the disk pinching or spacing operation by the disk pinching means are interlocked with sliding of a cam formed on a single slide plate.

3. The disk player loading mechanism as claimed in claim 2, characterized in that the turntable is formed integrally with a brushless spindle motor, and is moveable independent of the pickup.

4. A disk player loading mechanism comprising:

a turntable having a disk placement face and being moveable between a standby position and a disk reproduction position;

a drive board having a face and a pickup installed on the drive board face, the drive board face defining a reference face for setting the disk placement face of the turntable, wherein when the turntable is moved from the standby position to the disk reproduction position, a disk is chucked at the disk reproduction position so that the disk is set in parallel to, and at a predetermined interval from, the reference face, the chucking of the disk being done in cooperation with a disk clamp;

a carriage mechanism driven by a motor adapted to carry the disk from an insert port to the turntable, the turntable being mechanically moved together with carriage of the disk, wherein the carriage mechanism comprises: a disk guide plate, and a roller, the roller and disk guide plate being adapted to cooperate with one another such that the roller and disk guide plate are positioned spaced from the disk in association with chucking operation of the turntable and the disk clamp, and such that the roller and disk guide plate are positioned to cooperatively pinch the disk in association with disk releasing operation of the turntable and the disk clamp; and a single slide plate having a cam formed thereon, wherein operations by the turntable and disk clamp of chucking and releasing the disk and operations by the roller of disk pinching and spacing from the disk are each interlocked with sliding of the cam formed on the single slide plate;

whereby the operation of the turntable, the disk clamp, and the roller in conjunction with the single slide plate minimizes thickness dimension of the disk player loading mechanism.

5. The disk player loading mechanism as claimed in claim 4, further comprising a brushless spindle motor, the turntable being formed integrally with the brushless spindle motor, wherein the turntable is moveable independent of the pickup.

* * * * *